United States Patent [19]

Vamvakas

[11] 4,231,463
[45] Nov. 4, 1980

[54] BOTTLE STREAM COMBINER AND DIVIDER

[75] Inventor: Michael Vamvakas, Rocky River, Ohio

[73] Assignee: Niagara Bottle Washer Manufacturing Co., Cleveland, Ohio

[21] Appl. No.: 5,366

[22] Filed: Jan. 22, 1979

[51] Int. Cl.³ .......................................... B65G 47/68
[52] U.S. Cl. .................................. 198/446; 198/450; 198/624
[58] Field of Search ............................... 198/446–447, 198/445, 454, 452, 624, 625, 449, 450, 448

[56] References Cited

U.S. PATENT DOCUMENTS

| 1,755,721 | 4/1930 | Winkler et al. | 198/446 |
| 3,295,657 | 1/1967 | Snyder | 198/446 |
| 3,623,592 | 11/1971 | Anderson | 198/446 X |
| 4,060,166 | 11/1977 | Hartness et al. | 198/446 |

Primary Examiner—Robert B. Reeves
Assistant Examiner—Douglas D. Watts
Attorney, Agent, or Firm—Baldwin, Egan, Walling & Fetzer

[57] ABSTRACT

This application presents a method and apparatus for arranging and combining bottles standing on end which includes feeding a miscellaneous collection of the bottles toward a conveyor, receiving the bottles and conveying them in a direction along plural parallel paths spaced apart less than the diameter of the bottles, nudging the bottles toward these paths as the bottles move along, then guiding the bottles laterally inward of the parallel paths and again nudging the bottles onto the laterally inward paths.

8 Claims, 6 Drawing Figures

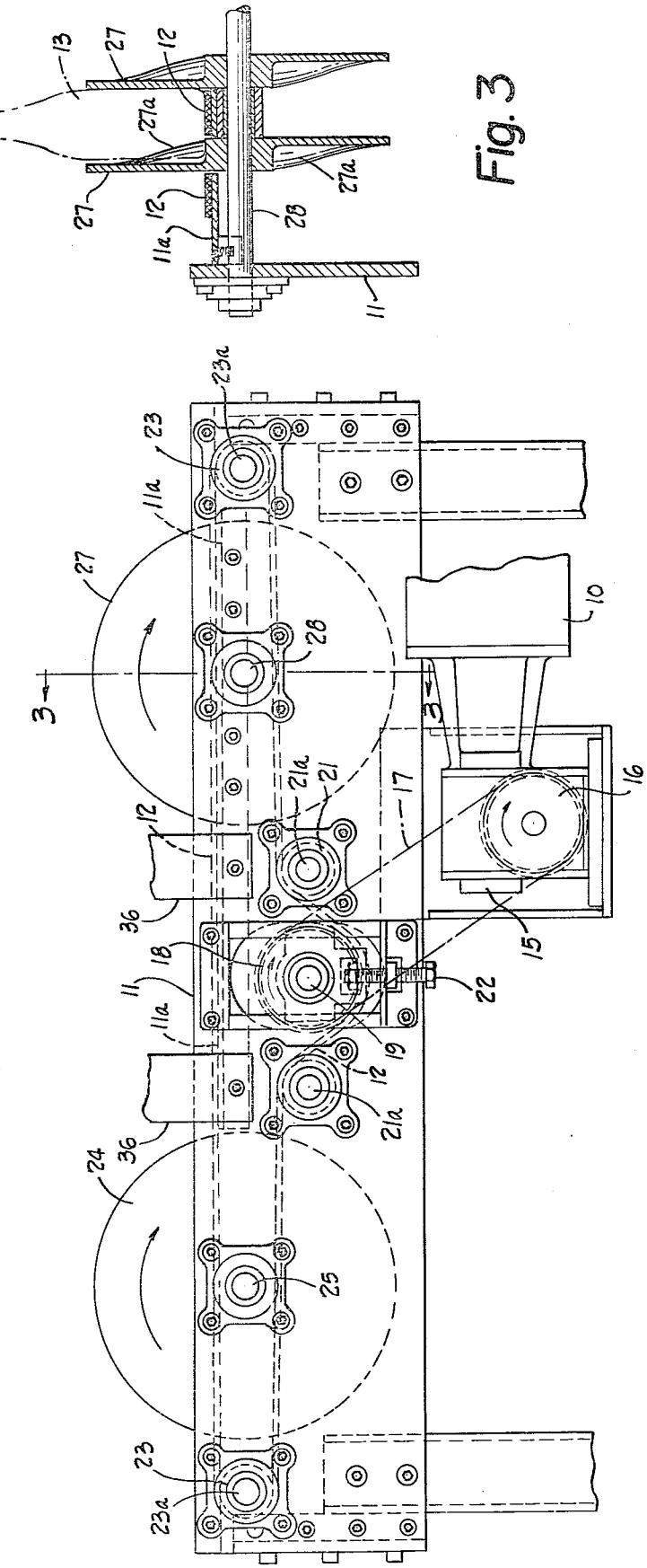

BOTTLE STREAM COMBINER AND DIVIDER

SUMMARY OF THE INVENTION

The purpose of this invention is to take a miscellaneous mass of bottles standing vertically and to organize the same in a plurality of lines of bottles which are then either combined from a larger number of rows to a smaller number of rows, or the bottles may be divided so that a smaller number of rows becomes a larger number after the division.

SPECIFICATION

Prior apparatus used in the performance of the function contemplated by this invention has been cumbersome, taking up a great deal of space. An object of the present invention is to provide the functions of the apparatus as described so that it only uses space three or four feet in length and only one or two feet in width.

Another object of the invention is to provide a flat horizontal table with a plurality of conveyor belts moving in parallel lines along said table, with means for feeding a plurality of bottles, standing vertically, onto the conveyor belts. Two series of helical wheels are arranged along two spaced shafts, each wheel mounted to rotate closely between the bottles on the associated conveyor belts and each wheel having generally vertical sides weaving sinuously from side to side and back again as the associated drive shaft rotates. These helical wheels nudge the bottles toward the conveyor belts. Side guides are laterally oscillated outside of the conveyor belts and these extend from a wider position close to the laterally outside bottles encountered by the helical wheels on one of the drive shafts to a narrower position close to the laterally outside bottles encountered by the helical wheels on the other drive shaft.

Other objects and advantages of the present invention will be set forth in the specification, and the accompanying drawings, and the essential features thereof will be set forth in the appended claims.

In the drawings,

FIG. 2 is a side elevational view of the same;

FIG. 3 is a fragmental sectional view taken along the line A—A of FIG. 2;

FIG. 5 is a side elevational view of the structure shown in FIG. 4; while

Figure 1:
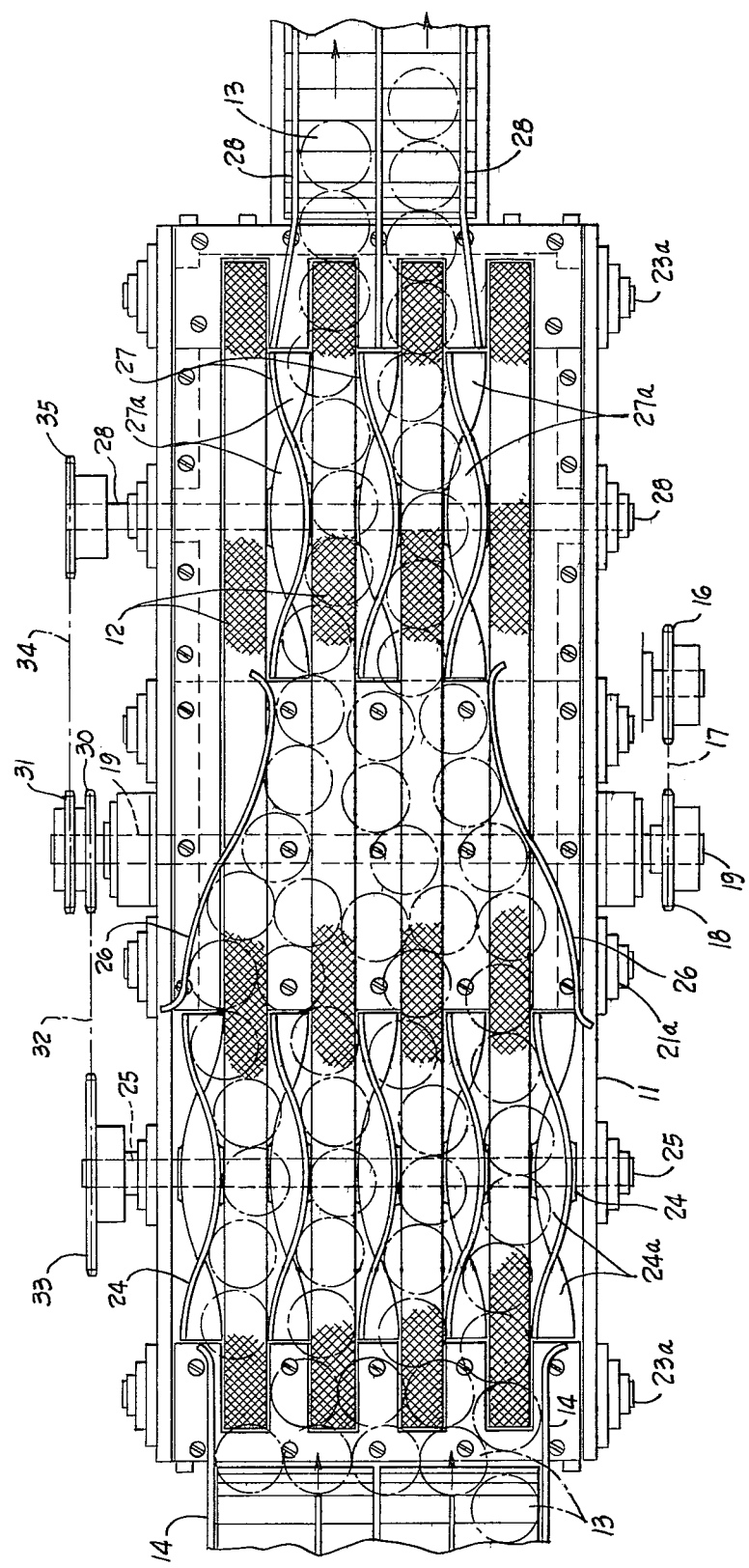
FIG. 1 is a top plan view of an apparatus for carrying out this invention.

A frame 10 supports a table 11 having a generally flat horizontal top 11a, along which extend a plurality of elongated conveyor belts 12 which move linearly upon the table top in parallel paths. The bottles 13 are received in a miscellaneous mass from a conveyor 14 which, in the preferred embodiment of this machine, discharges the bottles from a washing machine. The bottles are standing vertically and are delivered at the level of the table top 11a. The belts 12 are driven by a motor 15 which drives a pulley 16 which is drivingly connected by means of a chain connection 17 to a pulley 18 which drives shaft 19 upon which the pulley is mounted. The shaft 19 drives a plurality of drive pulley surfaces 20 which drive the conveyor belts 12. Preferably these conveyor belts are wire screen and endless and they pass over tightener pulleys 21 near the driving surfaces 20 and the tightening may be accomplished by a threaded bolt connection 22 as seen in FIG. 2. The drive belts pass over idler pulleys 23 which are rotatably supported at opposite ends of the table 11.

Figure 6:
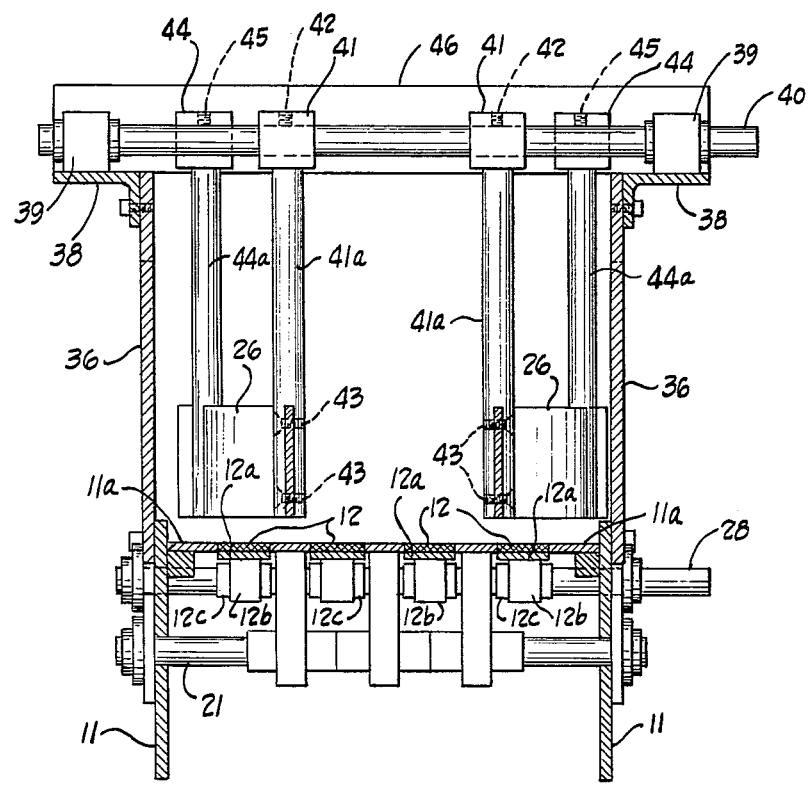
FIG. 6 is an end elevational view taken from the righthand side of FIG. 5.

It can be seen in FIG. 6 that longitudinally, beneath each of the conveyor belts 12, there is a rigid bar 12a which is actually a T-bar having a downwardly extending flange 12b which is mounted on shaft 25 by bushings 12c.

It will be noted that the conveyor belts 12 are spaced apart less than the diameter of the bottles 13 so that every bottle is in contact with a driving belt as it comes onto the table top 11a. As the bottles travel along the conveyor belts, they are nudged toward the conveyor belt paths. The means shown for this purpose in FIGS. 1 and 2 are a plurality of helical wheels 24 fixed on a drive shaft 25 rotatably supported in the frame below the table top 11a near the left end thereof as seen in FIGS. 1 and 2. These helical wheels are so arranged on the shaft 25 that they are located between the conveyor belts 12 and fairly close to the bottles passing along the belt. Each of the helical wheels 24 has generally vertical sides weaving sinuously from side to side and back again as shown at 24a in FIGS. 1 and 3, as the drive shaft rotates.

As the bottles travel down the conveyor belt, toward the right as seen in FIG. 1, the bottles are guided laterally inwardly by two side guides 26 oscillatable crosswise of belts 12 as will be presently described. These guides slope inwardly and toward the right as viewed in FIG. 1 causing the bottles to move laterally inwardly as they move down the table. Near the righthand end of the side guides 26 as seen in FIG. 1 the bottles come to a second plurality of helical wheels 27 fixed on a second drive shaft 28 rotatably mounted in the frame 10 beneath the level of the table top 11a. This second plurality of helical wheels 27 are exactly like those described with respect to the helical wheels 24. They are likewise mounted in a space between the conveyor belts 12 on opposite sides of the laterally innermost two belt conveyors 12. It will be noted in FIG. 1 that as the bottles leave the side guides 26, there is no place to go except into the two laterally innermost conveyor belts 12. The vertical sinuous walls of the helical wheels 27a are exactly like those shown at 24a in FIG. 3.

Figure 4:
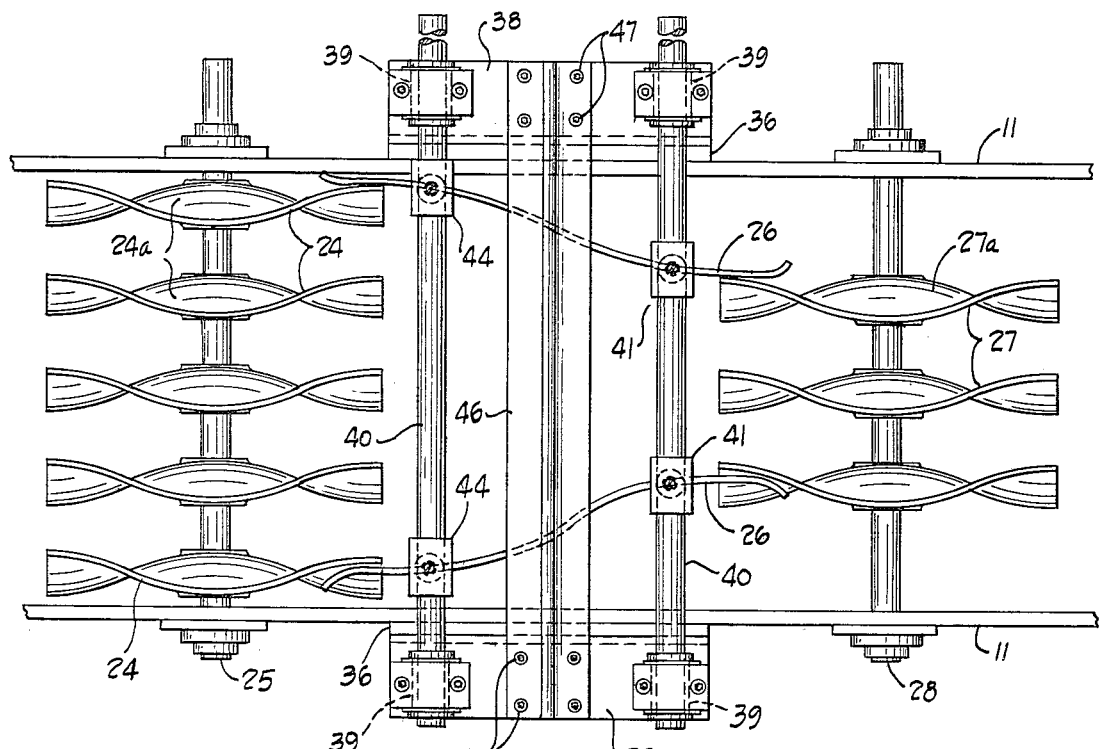
FIG. 4 is a fragmental plan view taken in the middle portion of FIG. 1 at a higher level than FIG. 1 to show the structure of the oscillating equipment for the side guides.
Figure 5:
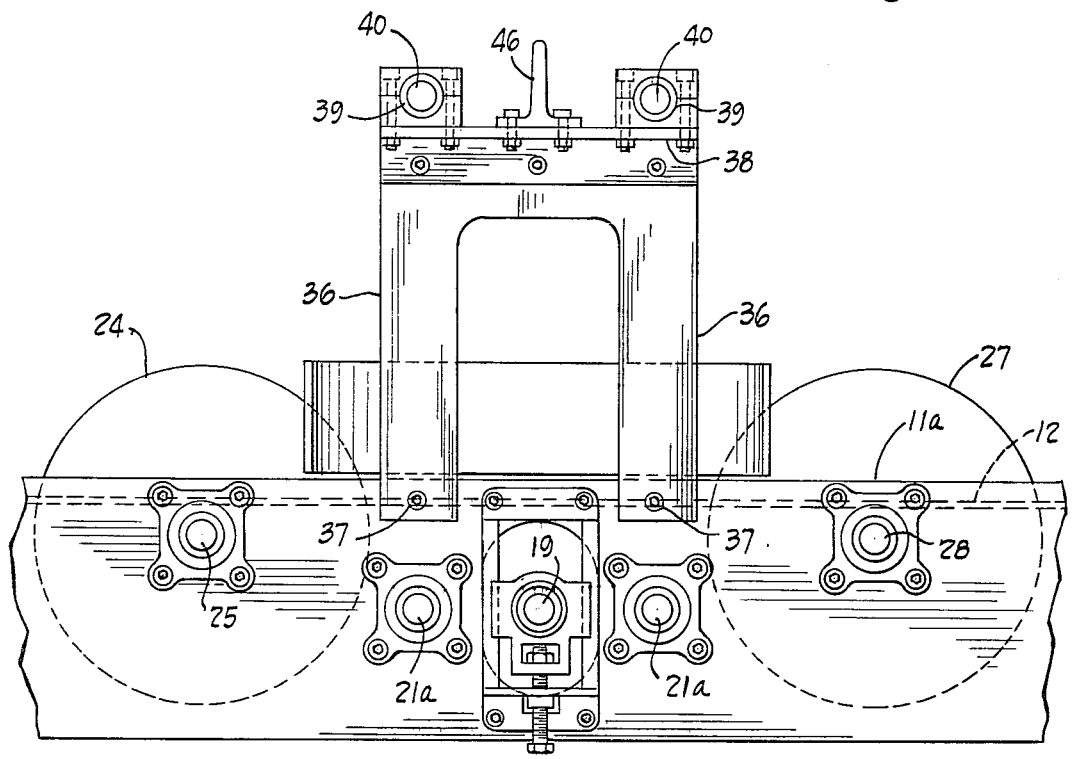

The mechanism for oscillating the side guides 26 is shown in drawings FIGS. 4, 5 and 6 so as to not confuse the drawings described in connection with FIGS. 1 and 2. The location of FIG. 5 is indicated on FIG. 2 by indicating the bottoms of the legs 36 of two brackets on opposite sides of the table 10 extending vertically upward and bolted at 37 to the frame of the machine. Each of these brackets extend upwardly to a level about 13 inches above the upper level of the conveyor belts 12 and then each bracket 36 has an outwardly turned flange 38 at 90°, and each of these flanges supports a Thomson anti-thrust ball bearing 39. A shaft 40 extends through these ball bearings across the entire width of the structure supported on the table top. The righthand shaft 40, as seen in FIG. 4, has two oscillator arms 41 secured to the shaft 40 by set screws 42. Extending down from the members 41 are vertical oscillator arms 41a which extend down through the level of the side guides 26 and are there secured near the righthand end of such side guides as seen in the drawings, at 43. Likewise, on the lefthand shaft 40, as seen in FIG. 4, there are affixed two oscillator members 44 by set screws 45, and each of these members has a downwardly vertically extending oscillator arm 44a and these extend down to the level of the side guides 26 and are there secured to the side guide by means not shown similar to that indicated at 43. The two structures mounted on brackets 36 on opposite sides of the table 10 are rigidly tied together by an inverted T-shape beam 46 bolted at 47 to the flange 38 at each end thereof.

It will now be apparent that during the operation of the bottle screen combiner and divider as described hereinabove, the rotation of the helical wheels 24 and 27 with their vertically sinuous side walls will oscillate the side guides 26 backwards and forwards crosswise of the belt tracks 12 to nudge the bottles laterally across the conveyor space of the unit.

As the bottles 13 leave the table 11 at the righthand end as seen in FIG. 1, they pass between the guides 28 onto a discharge conveyor 29 propelled toward the right as seen in FIG. 1 by means not shown.

The drive for the shafts 25 and 28 are clearly seen in FIG. 1. The shaft 19, driven as described in connection with FIG. 2, has two drive pinions 30 and 31 driven by the shaft 19. A chain drive 32 is connected between the pinion 30 and a drive gear 33 fixed on the shaft 25. Another chain drive 34 connects the pinion 32 with drive gear 35 fixed on the end of shaft 28. Preferably, where the pinion 30 has 15 teeth in one embodiment of this invention, the gear 33 has thirty teeth. This causes the shaft 25 to turn about one half the speed of the shaft 28. This causes the bottles from the left end of FIG. 1 to push toward the right therein and the wire belt conveyors described in connection with conveyor belts 12 will slide beneath the bottom of the bottles resting on the conveyor keeping a pressure on the bottles toward the right. In this same embodiment of this invention the pinion 31 has 15 teeth and the drive gear 35 on shaft 28 has 15 teeth also. This causes the second plurality of helical wheels to travel at the same linear speed as the conveyor belts 12.

It should be understood that while the invention has been described as starting with four bottles side by side at the inlet end of FIG. 1, and discharging two rows of bottles at the discharge end of the table 11, the invention could be used starting with six or eight bottles at the inlet end and terminating with any lesser number of rows at the righthand end of FIG. 1. Also, the structure as described in the present drawings, could discharge one or three rows of bottles at the righthand end of FIG. 1 instead of the two rows shown in the drawings.

What is claimed is:

1. A bottle stream separating device comprising a flat horizontal table, a plurality of elongated conveyor belts movable linearly upon said table, means for driving said belts in parallel paths at a predetermined linear rate in one direction, means for feeding a plurality of bottles standing vertically relative to said table into one end of said table and onto said conveyor belts, a first drive shaft supported below said table near one end thereof, a first plurality of helical wheels fixed on said shaft, each such wheel mounted to rotate closely between the bottles on the conveyor belts on either side thereof, each of said wheels having generally vertical sides weaving sinuously from side to side and back again as said drive shaft rotates, said wheel sides being of a vertical extent to hold a bottle upright as it rests on a conveyor belt, a second drive shaft supported below said table spaced from said first shaft, a second plurality of helical wheels fixed on said second shaft in position to rotate closely between the conveyor belts on either side thereof, each of said second wheels having generally vertical sides extending upwardly alongside said bottles, said second wheel sides weaving sinuously from side to side and back again as said second shaft rotates, two side guides laterally outside of said conveyor belts and extending from a wider position close to the outside bottles encountered by said helical wheels on said first drive shaft to a narrower position close to the outside bottles encountered by said helical wheels on said second drive shaft, means for driving said helical wheels on said first drive shaft at a greater peripheral speed than said predetermined linear speed, and means for driving said helical wheels on said second drive shaft at a speed less than that of said first drive shaft, whereby, when said conveyor belts are driven in a direction from said first drive shaft toward said second drive shaft, bottles in a greater number of rows at said first drive shaft are combined to a less number of rows at said second drive shaft, and when said conveyor belts are driven in a direction from said second drive shaft toward said first drive shaft, bottles in a lesser number of rows at said second drive shaft are divided into a greater number of rows at said first drive shaft.

2. A bottle stream separating device as defined in claim 1, wherein said helical wheels have a smooth sinuous curve extending from side to side about one-half the diameter of the bottle to be handled.

3. A bottle stream separating device as defined in claim 2, wherein there are five of said first plurality of helical wheels, and three of said second plurality of helical wheels.

4. A bottle stream separating device as defined in claim 3, wherein said first drive shaft revolves bottles on said first plurality of helical wheels at about one-half said predetermined linear rate, and said second drive shaft revolves bottles on said second plurality of helical wheels at about said predetermined lineal rate.

5. A bottle stream separating device as defined in claim 1, wherein said conveyor belts and helical wheels are moved in a direction to combine a larger number of rows of bottles into a lesser number of rows.

6. A bottle stream separating device as defined in claim 1, wherein said conveyor belts and helical wheels are moved in a direction to divide a lesser number of rows of bottles into a greater number of rows.

7. A bottle stream separating device as defined in claim 1, including means for oscillating said side guides crosswise of said conveyor belts by about the same amount as the sinuous effect of the helical wheel side guides.

8. The method of arranging and combining bottles standing on end while moving said bottles in a single plane, comprising feeding a miscellaneous collection of said bottles towards conveying means, receiving said bottles and conveying them in a direction along plural parallel paths spaced apart less than the diameter of said bottles, nudging said bottles toward said paths by rotating helical vanes between said paths as the bottles move in said direction said vanes being on an axis that is transverse to said paths of the bottles, then guiding said bottles toward the laterally inward of said parallel paths, and again nudging said bottles onto said laterally inward paths.

* * * * *